3,034,889
DECONTAMINATION OF URANIUM
Frank H. Spedding, Ames, Iowa, and Thomas A. Butler, Oak Ridge, Tenn., assignors to the United States of America as represented by the United States Atomic Energy Commission
No Drawing. Filed Mar. 3, 1953, Ser. No. 340,156
3 Claims. (Cl. 75—84.1)

This invention relates to the separation of uranium from mixtures containing uranium and type 4f-rare earth metals and other fission products in the metallic state. It is frequently found that separation of uranium from metallic compositions or mixtures containing this element in metallic state is quite difficult, particularly where the uranium is present in preponderant amount and where it is desired to remove metals in the uranium which are present in only small amount, for example less than 25 percent by weight of the uranium.

The problem is particularly acute when applied to the purification of uranium from fission products, since they are usually produced in extremely small concentrations generally totaling not in excess of about 0.00001 to 0.05 percent by weight of the uranium.

It has been established that when uranium is bombarded with neutrons, there is formed a variety of products of nuclear fission including one or several members of a light group of atomic numbers 35 to 46 inclusive and a heavy group of atomic numbers 51 to 60 and, in addition, a new element having an atomic number of 93 and an atomic weight of 239 which subsequently decays by beta decay to a second new element having an atomic number of 94 and an atomic weight of 239. This second new element is known as plutonium (symbol Pu). A substantial part of the so-called fission products consists of rare earth metals of the 4f group. As a general rule, only small quantities of plutonium are formed (less than 0.1 percent of the uranium), and as plutonium resembles uranium very closely in many of its chemical and physical characteristics, the discovery of a relatively simple process for the recovery of plutonium from the uranium mass has been exceedingly difficult.

An object of the present invention is to separate uranium from compositions containing metallic uranium and another metal.

Another object of the present invention is to provide a simple means and method for separating rare earth metals from a large amount of uranium associated with them.

Still another object of the invention is to provide a process of separating fission products from uranium.

Other objects will become apparent from consideration of the following description.

In accordance with the present invention, we have found that fission products and/or plutonium may be separated to a substantial degree from uranium by melting the uranium with a metal in which plutonium and fission products are preferentially soluble or which preferentially associates, absorbs or otherwise takes up plutonium and the fission products, preferably using an amount of the other metal sufficient to cause separation of said other metal as a phase comprising plutonium and/or the fission products generally in increased concentration. This phase may be separated from the uranium and used as such or subjected to further treatment for recovery of its components.

We have found that small quantities of many metals such as tin, copper, bismuth, silver or gold exert a preferential action for removal of plutonium and fission products. For example, as little as 2 to 5 percent of tin when melted with neutron-irradiated uranium removes as much as 85 to 90 percent by weight of the plutonium and a great part of the fission products, and, upon cooling of the melt, the plutonium-rich-tin phase separates in the form of solid dendrites dispersed in the uranium.

The dendrites or other phases which separate may be recovered in a simple manner as hereinafter described and a plutonium concentrate secured. The plutonium and fission products, which for the sake of simplicity will be hereinafter referred to as contaminants, may be present in that phase as an alloy, or in the form of a solid solution with, and/or a dispersion in, the added metal.

Generally is is deemed desirable to use an amount of metal just sufficient to remove the contaminants and bring them into a more concentrated form, and it is preferred to avoid the use of a large excess of the added metal since the addition of unnecessary metal merely serves to dilute the composition and plutonium, for instance, is removed in a less concentrated form. Consequently the amount of plutonium-removing metal should be substantially less than the amount of uranium subjected to treatment and rarely should exceed 20 percent by weight of the uranium; in most instances a quantity of not more than 10 percent was found best. The metals may be melted together by any convenient method. For example the uranium and other metal may be melted together or the other metal may be added to a molten pool of the uranium to be treated.

The form in which the plutonium-rich and/or fission products-containing phase separates out depends to a substantial degree upon the nature and quantity of metal used. Where tin and neutron-irradiated uranium are used, the tin phase generally separates upon cooling as dendrites dispersed in a uranium mass. On the other hand, when copper or silver is used the mixture stratifies, and the plutonium-copper or plutonium-silver phase may be removed either by tapping off this layer in molten state or by permitting the stratified composition to solidify and separating the layers by known means.

Frequently the problem of separating uranium from the dendrites or other solid phases present in a composition such as herein described is found to be rather complex, particularly where an accurate separation is desired.

In accordance with a further modification of the present invention it has been found that a satisfactory removal of uranium from uranium metal compositions containing other metallic components associated therewith may be effected by converting the uranium, or at least a substantial portion thereof, to uranium hydride or nitride leaving the other metals substantially unhydrided or unnitrided; but if hydrided or nitrided to some degree, these compounds of the other metals are in a form, due to physical and/or chemical characteristics, which permits a ready separation. In any case, the hydrided or nitrided product is surprisingly more amenable to treatment to effect an adequate separation of the uranium from the other metal phases than are the untreated metallic compositions. The reactivity of hydrogen with uranium has been found so great, though, that a selective conversion of the uranium to hydride may be secured without substantial effect upon numerous metals with which the uranium may be associated.

This essentially selective reaction for production of hydride may be effected by controlling the temperature at a suitably low level, for example, of 200 to 250° C. or up to 300° C. and at a sufficiently low pressure of the hydrogen atmosphere, for example, at from 3 to 150 millimeters absolute pressure to react the hydrogen rapidly with the uranium without substantial effect upon other metals which do not react or which react very slowly at the temperature of operation. A suitable process of hydrogenating uranium is described in copending application for United States Letters Patent of Amos S. Newton, Serial No. 546,178, filed July 22, 1944, entitled Method of Preparing Uranium Hydride, now Patent No. 2,446,780. The hydrogenated material should be cooled in an atmosphere of hydrogen to prevent dissociation thereof and then, if not processed at once, should be kept in an inert atmosphere of nitrogen or carbon dioxide on account of its pyrophoric nature. However, it may also be processed in air without hazard immediately after cooling.

Uranium hydride is much lighter and bulkier than uranium, and where it has been formed from uranium metal which is substantially free from oxide parting planes, it does not adhere to the uranium surface when it is formed but falls to the bottom of the reactor during formation. As a result, the hydrogen will react rapidly and substantially completely with massive uranium free, or substantially free, from internal oxide parting planes. On the other hand, it has been discovered that massive uranium prepared by sintering or otherwise bonding uranium powder together contains internal oxide parting planes, and hydrogen reacts with it to form only a coating of the hydride upon the surface which adheres and prevents further reaction until it has been removed. But when, as just set forth, massive uranium free from such oxide planes is treated, the hydride crumbles and falls from the uranium continuously exposing new uranium and causing the reaction to proceed until it has completed.

Thus it is usually preferable to subject uranium which is substantially free from oxide parting planes to neutron bombardment in order to treat it afterwards as herein contemplated. Uranium suitable for this process may be prepared by heating a mixture of $UF_4$ with metallic magnesium or calcium to reaction temperature, permitting reaction to occur to form molten uranium and maintaining the uranium in molten state for a time sufficient to allow the uranium to separate as a molten pool and the magnesium or calcium fluoride formed and other impurities to separate from the uranium and to collect as a slag layer which may be removed from the metal. This reaction is conducted in a bomb or other reactor in which oxygen or air may be excluded. Uranium so produced is in massive form, has a melting point below 1200° C., a density above 18 and is substantially free from oxide.

During hydrogenation the plutonium-rich phase is substantially unaffected by the hydrogen and remains in its metallic state. As a result, after treatment of the mass with hydrogen the plutonium-rich phase may be separated from the hydride by taking advantage of the differences in chemical and/or physical properties of the components. For example, the product usually is in a crumbled form containing finely divided hydride and coarser particles of the unhydrided plutonium concentrate. These two types of materials may be separated by sieving, flotation or other classification method. The uranium hydride separated may be decomposed by heating in an atmosphere of hydrogen at 400–500° C., and the metallic uranium recovered may then be used for production of additional plutonium.

The hydrogen-reacted product may also be treated with a solvent which selectively converts the hydride or the plutonium concentrate to a soluble state. The nature of the solvent will be determined by the metal used to concentrate the plutonium. Where tin is used, the mixture of hydride and tin-contaminants component may be extracted with 2 to 3 normal HCl solution, usually at an elevated temperature, for example at about 90° C., to remove the tin, fission products and plutonium and leaving the hydride behind. Sulfuric acid and other non-oxidizing acids of concentration up to 2 or 3 normal may be used in a similar manner. Where gold is used to remove the plutonium and/or fission products, the mixture of uranium hydride and gold may be treated with silver nitrate solution in order to dissolve uranium and leave the gold unaffected.

In a similar manner the hydrided uranium may be removed from other metals by selectively converting the uranium hydride to a water-soluble chloride, bromide or sulfate or other water-soluble salt using reagents of relatively low acidity to prevent attack of the unhydrided component or by using an oxidizing agent, such as silver nitrate, and converting the uranium to the uranyl state to form a water-soluble uranyl compound, such as uranyl nitrate. Other solutions, such as those of antimony chloride ($SbCl_3$), silver acetate, mercurous nitrate, may also be used to convert the uranium hydride to a water-soluble state and permit removal thereof. Numerous other oxidizing agents, particularly weak oxidizing agents capable of oxidizing metallic or hydrided uranium to hexavalent or tetravalent uranium, including silver perchlorate and silver tartrate, may be used in a similar manner.

As previously pointed out, uranium hydride is somewhat difficult to handle due to its pyrophoric nature. This difficulty can be overcome, however, by converting the uranium hydride to uranium nitride. The nitride is a comparatively stable substance that can be handled readily in the air without serious danger of fire or explosion. This conversion can be carried out by treating the uranium hydride with ammonia, $NH_3$, at a relatively low temperature, for example 200–350° C. The uranium hydride is converted by this process to uranium nitride having a formula corresponding approximately to UN, and the nitride so formed may be separated by sieving, flotation or other classification process or by a suitable preferential extraction process.

In accordance with a further modification, the uranium metal can be directly converted to the nitride by treatment with ammonia. This process of direct treatment of uranium with ammonia, however, may require a considerably longer time to go to completion where the temperature of nitride formation is maintained at a low level.

If desired, uranium metal or uranium hydride can be treated with ammonia at elevated temperatures such as 800° C. to 1000° C. to form a nitride having a composition corresponding approximately to the formula $U_4N_7$. This high temperature nitride is similar to the low temperature nitride, UN, in many of its physical and chemical characteristics.

When the uranium hydride or the uranium metal is converted to nitride, the contaminant-rich phase is not affected and remains in its metallic state. Accordingly, it can be separated from the nitride by physical means, such as sieving or flotation, or by chemical means such as leaching with acid which dissolves the contaminants-containing concentrate and leaves the nitride substantially unaffected.

The metal concentrate obtained contains plutonium and most fission products in concentration substantially greater than that present in neutron-irradiated uranium. Usually the concentration is at least 3 to 5 times the plutonium concentration, for instance, of neutron-irradiated uranium based upon the total metal content of the concentrate. The plutonium, if desired, may be further concentrated by suitable means such as by precipitation or adsorption from solution or by other methods.

The following examples are illustrative:

EXAMPLE 1

5.27 parts by weight of metallic tin were melted with 107 parts by weight of neutron-irradiated uranium containing about 200 milligrams of plutonium per ton of uranium. The uranium itself was substantially free from oxide, had a melting point of 1100±25° C. and had a density of 19±0.1. After mixing the molten mass until the components were well mixed the mixture was permitted to cool and solidify. The solidified tin-uranium alloy appeared to be scattered throughout the unalloyed uranium metal mass in the form of dendrites of substantial size. The mass was placed in a chamber, the chamber evacuated and flushed with hydrogen and the temperature of the chamber raised to 250° C. Hydrogen was introduced at a rate sufficient to maintain the hydrogen pressure at about 25 mm. of mercury absolute pressure. Upon conversion of the uranium to the hydride the dendrites were unaffected and remained as coarse particles which were separated by sieving. Approximately 10 parts by weight of a fraction which failed to pass a 270 mesh screen were secured. This fraction contained about 50 percent of the plutonium initially in the uranium and also contained about 78 percent by weight of uranium and 20 percent by weight of tin. Similar results may be secured when the uranium is converted to nitride.

EXAMPLE 2

The process of Example 1 was repeated using 101 parts by weight of irradiated uranium and 2.6 parts by weight of bismuth in lieu of tin. 5 parts by weight of a fraction which failed to pass a 270 mesh screen were secured. This fraction contained approximately 20 percent of the plutonium.

EXAMPLE 3

100 parts by weight of neutron-irradiated uranium metal and 4.6 parts by weight of metallic tin were melted, cooled and reacted with hydrogen as described in Example 1. The mass was leached with 2 normal HCl in a carbon dioxide atmosphere at 80 to 90° C. for one hour. 92 percent of the plutonium was dissolved with about 13 percent of the uranium and 70 percent of the tin.

EXAMPLE 4

The process of Example 1 was repeated forming the uranium hydride as therein described. Thereafter gaseous $NH_3$ was led into the chamber while the temperature was maintained at 250° C. and the hydride converted to nitride. This nitride was separated by the method of Example 1.

EXAMPLE 5

The process of Example 1 was repeated melting 14 parts by weight of silver and 86 parts by weight of the uranium; a very sharp line between phases separating the top cap of silver from the uranium metal mass was found. The mixture was hydrogenated as in Example 1. The cap was not affected by the hydrogenation. 82 percent of the plutonium initially in the uranium was concentrated in the silver cap, along with 98 percent of the silver and 3 percent of the uranium. Analysis of the cap showed it to be 89.5 percent silver and 9.2 percent uranium.

When copper is used as an alloying metal the copper-uranium alloy forms a separate phase that collects at the top of the uranium mass. This phase is disintegrated on hydrogenation, due to the presence of some free uranium in the copper-uranium composition. The copper-uranium compound, however, can be substantially separated by sieving and there is an appreciable concentration of the plutonium therein. However, the degree of removal of plutonium by means of this metal is not as high as may be achieved with the use of tin, silver or bismuth.

Combinations of various metals can be used with advantage to form alloys that will remove plutonium from uranium. Silver-gold and silver-tin have been found to be good alloying combinations. A combination of silver and gold is particularly satisfactory since it seems to retain the good separability of the silver and the high plutonium adsorption of the gold.

Both the sliver-gold and the silver-tin alloys form separate phase caps on top of the uranium metal. In the case of the silver-gold alloy, a substantial amount of the cap is insoluble in nitric acid. Since this insoluble fraction contains most of the plutonium, a substantial concentration of the plutonium may be effected even without recourse to the hydrogenation step. The following example illustrates a suitable method for the use of metal combinations to remove plutonium.

EXAMPLE 6

The following composition was prepared:

| | Parts by weight |
|---|---|
| Ag | 12.95 |
| Au | 0.86 |
| Neutron-irradiated uranium | 86.1 |

The mixture was heated in one atmosphere of helium at 1350° C. for 3 minutes and allowed to cool and stratify. The cooling was caused to take place at a slow rate to enable the light silver phase to separate completely. The product, after solidification, was subjected to the action of hydrogen as in Example 1. The silver cap did not disintegrate during this treatment. The remainder crumbled and was sifted through 200 and 300 mesh sieves. Analyses were run on the fractions including the cap, plus 200 mesh, 200–300 mesh and minus 300 mesh fractions. The cap itself was analyzed to determine the composition of its $HNO_3$-soluble and insoluble components. Results are shown in the following table:

*Composition of Fraction*

| Fraction | Percent U | Percent Ag | Percent Au | Percent of Total | | | |
|---|---|---|---|---|---|---|---|
| | | | | U | Ag | Au | Pu |
| Cap | 20.0 | 75.9 | 1.5 | 4.33 | 97.1 | 69.6 | 91.3 |
| $HNO_3$-soluble | 19.2 | 75.4 | .035 | 4.17 | 98.5 | 1.85 | 76.9 |
| Insoluble | 23.6 | 17.0 | 34.4 | .16 | .57 | 67.8 | 14.3 |
| −180 mesh | 70.8 | 22.8 | 1.02 | .86 | 1.63 | 2.71 | 2.95 |
| 180–300 mesh | 93.6 | 4.05 | .74 | 2.94 | .75 | 5.05 | 2.65 |
| −300 mesh | 97.3 | 0.069 | .11 | 91.8 | .38 | 22.7 | 3.28 |

This process was repeated using one part by weight of tin, 15 parts by weight of silver and 85 parts by weight of irradiated uranium. The results are shown in the following table:

*Composition of Fraction*

| Fraction | Percent Sn | Percent Ag | Percent U | Percent of Total | | |
|---|---|---|---|---|---|---|
| | | | | Ag | U | Pu |
| Cap | 2.0 | 76.7 | 18.4 | 98.2 | 4.58 | 87 |
| −200 mesh | 4.0 | 18.4 | 72.8 | 1.33 | 1.07 | 3.4 |
| 200–325 | 1.2 | 1.44 | 91.4 | .37 | 4.88 | 0.93 |
| −325 mesh | .35 | 0 | 97.7 | 0 | 89.2 | 8.7 |

While the invention has been described with particular reference to the modification involving separation of the uranium by reaction with hydrogen and/or ammonia, it is not limited to such a method. Thus the uranium may be separated by selective extraction of the uranium or of the contaminants-rich phase by a solvent. Moreover the plutonium-rich and/or rare earths-rich fraction may be separated by gravity and drawn off in liquid state, or the melt may be allowed to solidify and the layers recovered simply by breaking up the solidified aggregate and separating the stratified components. This process is particularly effective with silver alloys.

Moreover the process herein described for removal of uranium by alloying, possibly followed by conversion to hydride and/or nitride, is not limited to processes for recovery or concentration of plutonium, but it may also be applied to the separation of uranium from other alloys or metallic phases in the presence or absence of plutonium. For example misch metal or other rare earth metals of the 4f-type may be separated from uranium by alloying with one of the metals listed. The process of this invention is also useful for treating uranium metal which still is more or less contaminated by rare earth metals derived from the uranium ores, such as monazite sand. The invention is furthermore applicable to the separation of fission products from uranium of neutron-irradiated pure $U^{233}$- or $U^{235}$-containing fuel elements of power reactors.

In the following an example is given to illustrate the application of the process of this invention to the separation of fission products from uranium.

EXAMPLE 7

Three samples of neutron-bombarded uranium were alloyed each with a different metal, as indicated by the table below, by melting the metals in a beryllia crucible in vacuum. Thereafter the crucible was slowly cooled to room temperature. The metal mixture was then treated with hydrogen as previously described whereby the uranium only was converted to the hydride. The hydride was present in the form of a fine powder while the nonconverted phase was in the form of considerably coarser particles. The powder was separated by sieving, and two screens were used for this purpose, namely one of 270 mesh and one of 400 mesh, yielding three fractions, +270, 270–400 and —400. In all cases the first two fractions were found mainly to be the intermetallic compound or concentrate, and they were therefore analyzed together as the +400-fraction. The results are compiled in the following table:

| Alloy | Al | Sn | Bi |
|---|---|---|---|
| Percent added metal | 2.17 | 5.16 | 0.90 |
| Comp. of new phase | 11.4% Al | 16.2% Sn | 14.9% Bi |
| Percent of total alloy existing in this phase | 19 | 32 | 6 |
| Comp. of —400 fraction | 1.3% Al | 2.2% Sn | 0.4% Bi |
| Percent fission products (of original content) in new phase: | | | |
| Ba | 50 | 37 | 22 |
| Sr | 47 | 39 | 22 |
| Te | 31 | 64 | 43 |
| Zr | 39 | 63 | 26 |
| Ce | 78 | 68 | 55 |
| La, Y, Pr | 67 | 60 | 40 |
| Ux$_1$ | 65 | 68 | 29 |
| Np | 34 | 52 | 27 |

These results show that in all three cases the fission products listed have been enriched in the alloy phase.

This application is a continuation-in-part application of application Serial No. 556,498, filed by us on September 29, 1944, on Plutonium Alloy and Production Thereof, now Patent No. 2,778,730.

The subject matter of this application is also generally related to that described and claimed in application Serial No. 556,499, filed on September 29, 1944, by Thomas A. Butler, now Patent No. 2,785,046 issued March 12, 1957, which covers the separation of uranium from other metals by hydriding and/or nitriding while this instant application is directed to the separation of uranium from other metals by alloying alone and by alloying in combination with a hydriding and/or nitriding step.

Although the present invention has been described with paricular reference to the specific details of certain embodiments thereof, it is not intended that such details shall be regarded as limitations upon the scope of the invention except insofar as included in the accompanying claims.

What is claimed is:

1. A method of separating fission products from a mixture containing said fission products together with predominant quantities of uranium metal, comprising melting said mixture with from 2 to 20% by weight of aluminum metal whereby said fission products alloy with the aluminum metal in the form of a separate phase while said uranium metal remains non-alloyed, and separating said alloy phase from said uranium metal.

2. The process of claim 1 wherein the molten uranium metal plus the alloy are cooled to a temperature of from 300 to 200° C., hydrogen is passed through the uranium metal whereby uranium hydride powder is formed while the alloy remains in the form of coarse particles, and the powder is separated from the coarse particles.

3. The process of claim 2 wherein aluminum is added in a quantity of about 2% by weight with respect to the uranium present in the mixture.

References Cited in the file of this patent

UNITED STATES PATENTS 2,778,730     Spedding et al.     Jan. 22, 1957